United States Patent
Saito

(10) Patent No.: US 10,212,335 B2
(45) Date of Patent: Feb. 19, 2019

(54) ELECTRONIC APPARATUS AND CONTROL METHOD THEREFOR

(71) Applicant: CANON KABUSHIKI KAISHA, Tokyo (JP)

(72) Inventor: Kyota Saito, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 84 days.

(21) Appl. No.: 15/393,050

(22) Filed: Dec. 28, 2016

(65) Prior Publication Data

US 2017/0195552 A1    Jul. 6, 2017

(30) Foreign Application Priority Data

Jan. 5, 2016   (JP) .................. 2016-000482

(51) Int. Cl.
   *H04N 5/228*   (2006.01)
   *H04N 5/222*   (2006.01)
   *H04N 5/232*   (2006.01)
   *G06F 3/0484*  (2013.01)

(52) U.S. Cl.
   CPC ..... *H04N 5/23216* (2013.01); *G06F 3/04845* (2013.01); *H04N 5/23245* (2013.01); *H04N 5/23293* (2013.01)

(58) Field of Classification Search
   CPC ........... H04N 5/23216; H04N 5/23293; H04N 5/23245; G06F 3/04845
   See application file for complete search history.

(56) References Cited

U.S. PATENT DOCUMENTS

| 2012/0134642 A1* | 5/2012 | Okamura | H04N 5/2252 386/230 |
| 2014/0098273 A1* | 4/2014 | Ito | H04N 5/23216 348/333.03 |

FOREIGN PATENT DOCUMENTS

JP    2012-203143 A    10/2012

* cited by examiner

*Primary Examiner* — Lin Ye
*Assistant Examiner* — John H Morehead, III
(74) *Attorney, Agent, or Firm* — Canon U.S.A., Inc. IP Division

(57) ABSTRACT

An electronic apparatus includes a touch detection unit that detects a touch operation on an extra-viewfinder display unit, an access detection unit that detects access to a viewfinder unit including an intra-viewfinder display unit, and a control unit that performs control to perform specific processing based on a touch position, wherein, if access is not detected, after a touch on the extra-viewfinder display unit is started, control is performed to perform the specific processing based on the touch position, and, if access is detected, even when a touch on the extra-viewfinder display unit is started, control is performed not to perform the specific processing based on the touch position, and to perform the specific processing based on a position where the touch is released.

33 Claims, 8 Drawing Sheets

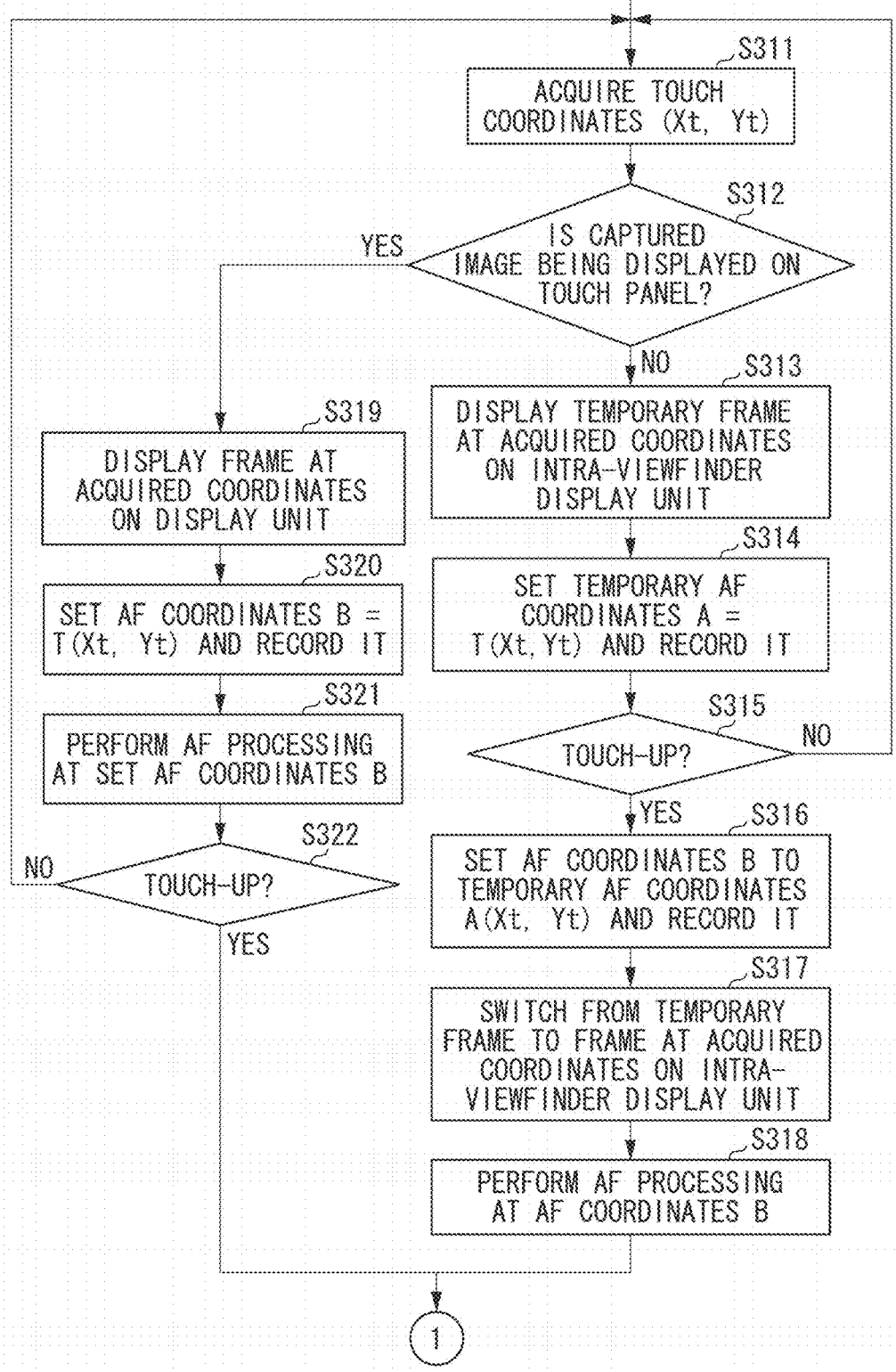

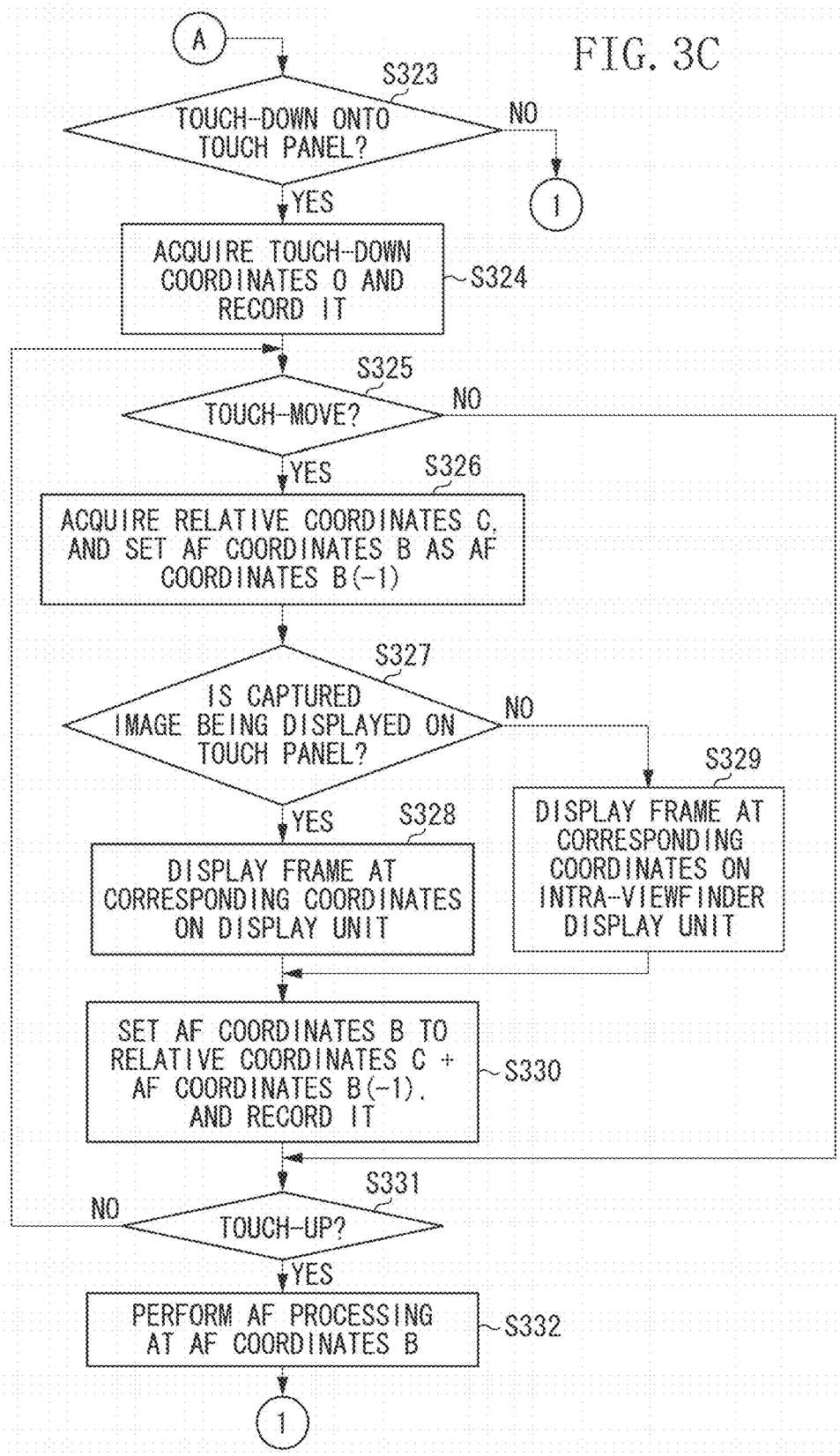

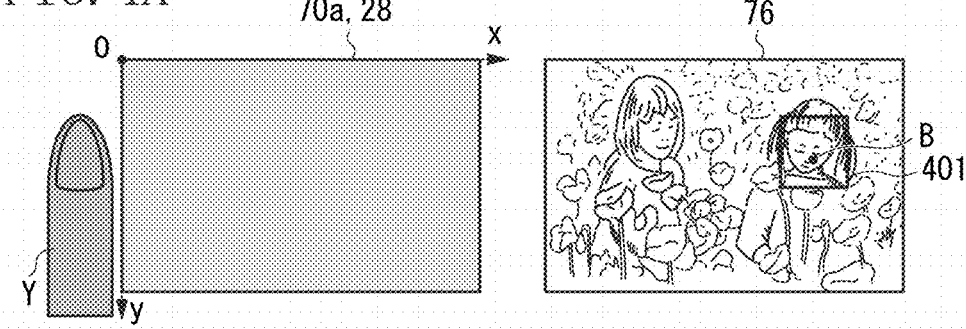
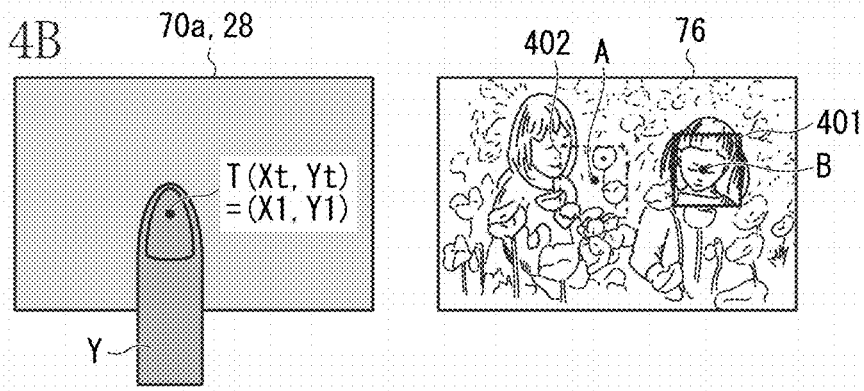
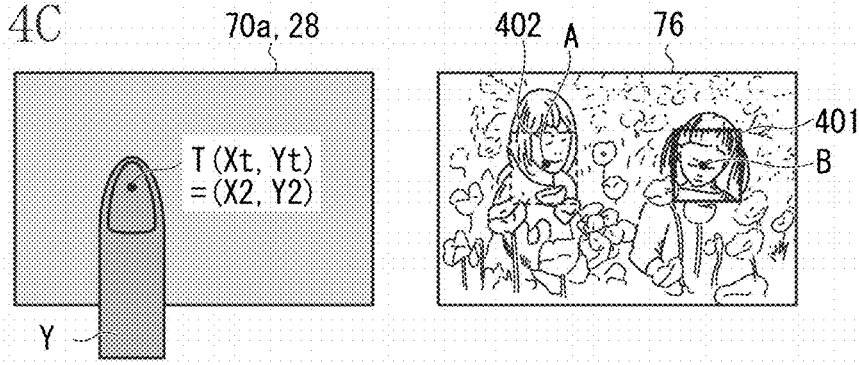
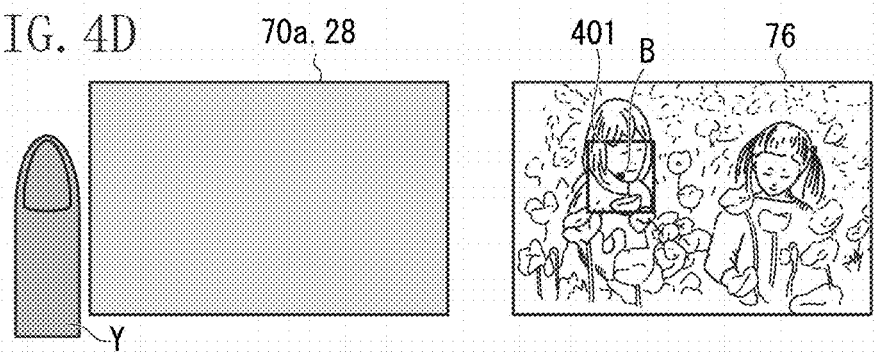

ELECTRONIC APPARATUS AND CONTROL METHOD THEREFOR

BACKGROUND

Field

Aspects of the present disclosure generally relate to an electronic apparatus and a control method therefor and, in particular, to a technique to set a position where to perform specific processing with a touch operation.

Description of the Related Art

Recently, there has been an increase in cases where a user performs an operation on a touch panel (touch screen) to, for example, select or change a position where to perform specific processing. Japanese Patent Application Laid-Open No. 2012-203143 discusses a technique enabling moving an autofocus (AF) target position by moving a touch position, in which, when looking through a viewfinder, the user can double tap a touch panel to cause AF to be performed at a set AF target position. This technique also enables the user, when not looking through the viewfinder, to release a touch, without performing a tap operation or slide operation, to cause AF processing to be performed at the set AF target position.

In the case of changing a position serving as a criterion for AF processing in the method discussed in Japanese Patent Application Laid-Open No. 2012-203143, operations are required to be performed in the following procedure. When looking through the viewfinder, the user touches and then moves an AF target position with a slide operation and then, double taps to cause AF to be performed. In other words, even after the AF target position is moved to an intended position, unless the user releases a touch and then double taps, AF is not performed. When the user is not looking through the viewfinder, AF is not performed until, after touching a position intended to be set as an AF target position, the user releases the touch. Therefore, in the method discussed in Japanese Patent Application Laid-Open No. 2012-203143, in the case of setting a position where to perform specific processing, the specific processing may not be able to be promptly performed.

SUMMARY

Aspects of the present disclosure are generally directed to providing an electronic apparatus that promptly performs specific processing in a case where a user determines a position where to perform the specific processing with a touch operation.

According to embodiments, an electronic apparatus includes a touch detection unit configured to detect a touch operation performed on an extra-viewfinder display unit, an access detection unit configured to detect access to a viewfinder unit including an intra-viewfinder display unit, and a control unit configured to perform control to perform specific processing based on a position of the detected touch operation, wherein, in a case where no access is detected, after a touch on the extra-viewfinder display unit is started, the control unit performs control to perform, during the touch, the specific processing based on a position where the touch is detected, and wherein, in a case access is detected, even if a touch on the extra-viewfinder display unit is started, the control unit performs control not to perform the specific processing on a position where the touch is detected, and when the touch is released from the extra-viewfinder display unit, the control unit performs control to perform the specific processing on a position where the touch is released.

Further features will become apparent from the following description of exemplary embodiments with reference to the attached drawings.

BRIEF DESCRIPTION OF THE DRAWINGS

FIGS. 3A, 3B, and 3C are flowcharts illustrating processing for setting autofocus (AF) coordinates in the exemplary embodiment.

FIGS. 4A, 4B, 4C, and 4D illustrate behaviors performed when a display is made on an intra-viewfinder display unit with absolute coordinate setting in the exemplary embodiment.

DESCRIPTION OF THE EMBODIMENTS

Various exemplary embodiments, features, and aspects will be described in detail below with reference to the drawings.

It is to be noted that the following exemplary embodiment is merely one example and can be appropriately modified or changed depending on individual constructions and various conditions of apparatuses. Thus, the following exemplary embodiment is not seen to be limiting.

Figure 1A:
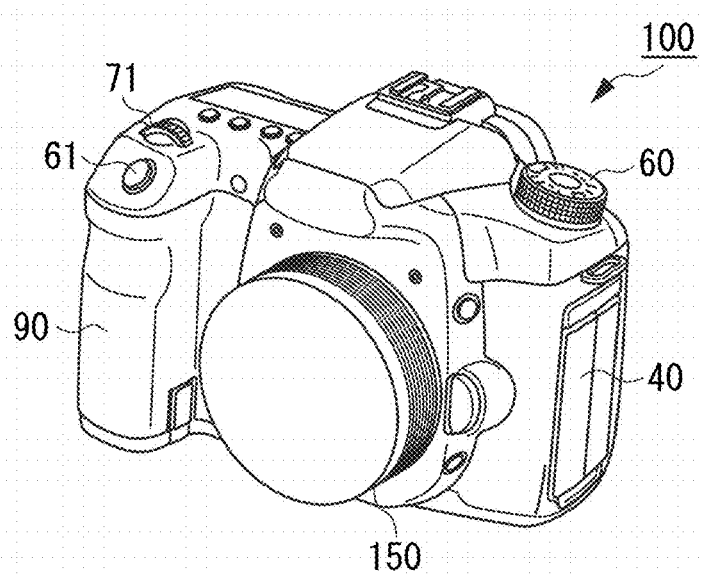
FIGS. 1A and 1B are appearance diagrams illustrating an example of an apparatus according to an exemplary embodiment.
Figure 1B:
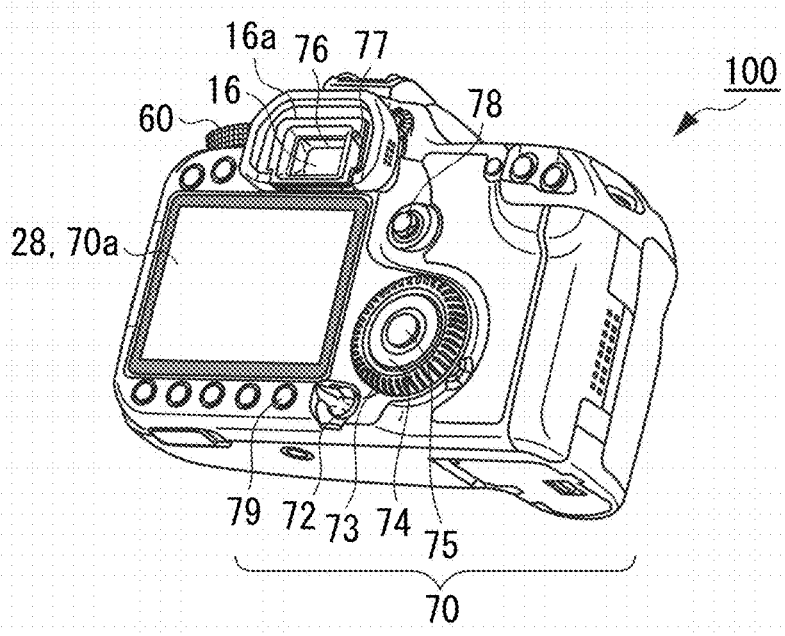

FIGS. 1A and 1B illustrate external views of a digital camera 100 serving as an example of an imaging control apparatus to which an exemplary embodiment is applicable. FIG. 1A is a front perspective view of the digital camera 100, and FIG. 1B is a rear perspective view of the digital camera 100. A display unit 28, which displays images and various pieces of information, is provided with a touch panel 70a, which is capable of receiving a touch operation. A shutter button 61 is an operation unit operable to issue a shooting instruction. A mode changeover switch 60 is an operation unit operable to change over various modes.

A terminal cover 40 is a cover that protects a connector (not illustrated), such as a connection cable that connects an external apparatus and the digital camera 100. A main electronic dial 71 is a rotary operation member included in an operation unit 70. The main electronic dial 71 is rotatable to, for example, change setting values, such as a shutter speed and an aperture value. A power switch 72 is an operation member that switches the digital camera's 100 power ON and OFF. A sub-electronic dial 73 is a rotary operation member included in the operation unit 70, and is used to move a selection frame or to feed images. Arrow keys 74, which are included in the operation unit 70, are arrow keys (four direction keys) upper, lower, left-side, and right-side portions of which are independently pushable. An operation corresponding to the pushed portion of the arrow keys 74 is selected to be performed. A SET button 75, which is included in the operation unit 70, is a push button and is mainly used to, for example, determine a selection item. A live view (LV) button 78, which is included in the operation unit 70, is a button used to switch between ON and OFF of live view (hereinafter referred to as "LV") display of the display unit 28 when a still image shooting mode is selected. When a moving image shooting mode is selected, the LV button 78 is used to start and stop a moving image shooting (recording) operation.

A playback button 79, which is included in the operation unit 70, is an operation button used to switch between a shooting mode and a playback mode. When the playback button 79 is pushed during the shooting mode, the digital camera 100 shifts to the playback mode, and the latest image from among images recorded on a recording medium 200 are displayed on the display unit 28. A grip portion 90 is a holding portion used to perform an operation while holding the digital camera 100. The operation unit 70 is provided at the side of the grip portion 90. A lens unit 150 is a lens section that is detachable from the digital camera 100.

When looking through a viewfinder 16 (a viewfinder unit), the user can view a subject through an optical viewfinder (OVF). An eyepiece sensor 77 is an access detection unit (an object detection unit) configured to detect access of an object to a position within a predetermined distance, such as 1 cm or 2 cm. For example, when the user brings the user's eye closer to the viewfinder 16, i.e., looks through an eyepiece portion 16a, to view an intra-viewfinder display unit 76, the eyepiece sensor 77 detects access of an object, i.e., the eye, and a display on the intra-viewfinder display unit 76 superimposed on a subject viewed through the OVF.

When the eyepiece sensor 77 detects that the object, i.e., the eye, has moved away by greater than or equal to the predetermined distance, displaying of, for example, items on the intra-viewfinder display unit 76 is turned off. When the user looks through the viewfinder 16, displaying on the display unit 28 is turned off, but a touch operation performed on the touch panel 70a to, for example, set an AF position can be received. At this time, when the user performs a touch operation on the touch panel 70a while holding the grip portion 90 and keeping the user's finger on the shutter button 61, the user can promptly perform an operation for movement of the AF position and a shooting instruction while viewing displaying on the intra-viewfinder display unit 76 and a subject viewed through the OVF. Displaying on the viewfinder 16 can be performed with an electronic viewfinder (EVF) instead of an OVF.

Figure 2:
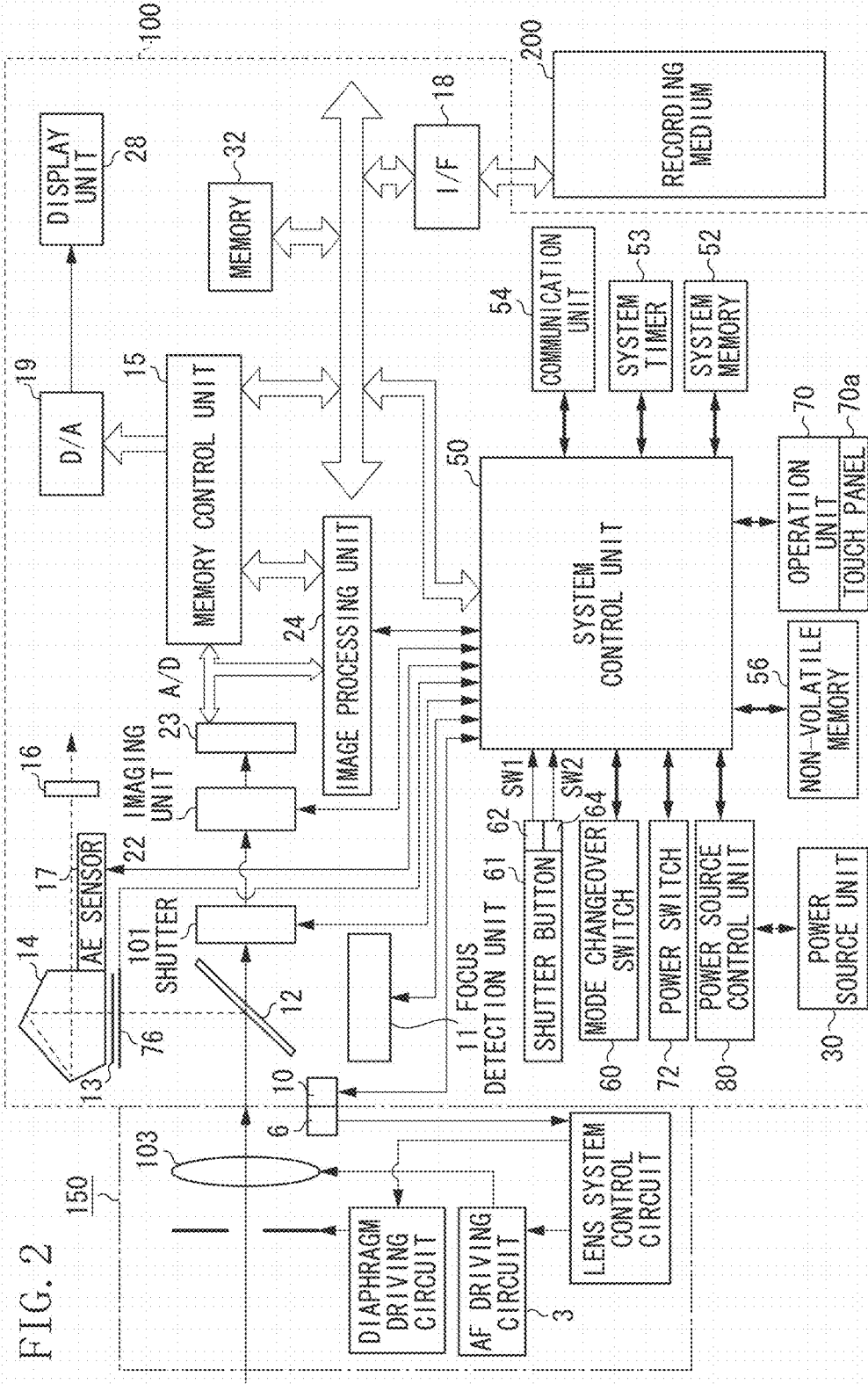
FIG. 2 is a block diagram illustrating a configuration example of a digital camera serving as an example of the apparatus to which the configuration of the exemplary embodiment is applicable.

FIG. 2 is a block diagram illustrating a configuration example of the digital camera 100 according to the present exemplary embodiment. The lens unit 150 is a lens unit including an interchangeable photographic lens mounted therein. A lens 103 is typically composed of a plurality of lenses, but is illustrated here as a single lens for ease of description. A communication terminal 6 is used for the lens unit 150 to perform communication with the digital camera 100, and a communication terminal 10 is used for the digital camera 100 to perform communication with the lens unit 150. An automatic exposure (AE) sensor 17 performs light metering about the luminance of a subject (image) formed on a focusing screen 13 through the lens unit 150 and a quick-return mirror 12.

The quick-return mirror 12 (hereinafter referred to as a "mirror 12") is moved up and down by an actuator (not illustrated) under an instruction from a system control unit 50 during exposure, live view shooting, and moving image shooting. The mirror 12 switches a light flux coming from the lens 103 between advancing toward the viewfinder 16 and advancing toward an imaging unit 22. The mirror 12 is located in such a way as to reflect and direct the light flux to the viewfinder 16 at the normal time, but, in the case of shooting being performed or in the case of a live view being displayed, is moved upward and retracted from within the optical path (mirror up) in such a way as to direct the light flux to the imaging unit 22. The mirror 12 includes a central portion made as a half-mirror to transmit a part of light, thus transmitting and causing a part of the light flux to enter a focus detection unit 11 provided for focus detection.

The user observes an image formed on the focusing screen 13 through a pentagonal prism 14 and the viewfinder 16. This enables the user to confirm the focusing state and composition of an optical image of the subject obtained through the lens unit 150.

The intra-viewfinder display unit 76 is a display unit located on an optical path leading from the lens 103 to the viewfinder 16, and is configured to display thereon a frame indicating the current AF coordinates and, for example, icons indicating the setting state of the camera via the system control unit 50. The focusing screen 13 and the intra-viewfinder display unit 76 are located in proximity to each other and are superposed on each other in such a way as to enable confirming respective displays thereof at a time.

The focus detection unit 11 is an AF sensor of the phase difference detection type, which outputs defocus amount information to the system control unit 50 based on a captured image. The system control unit 50, which controls the lens unit 150 via the communication terminals 6 and 10, performs phase-difference AF by changing the position of the lens 103 based on the defocus amount information via an AF driving circuit 3. The AF method is not limited to phase-difference AF, but can be any method, such as contrast AF.

The imaging unit 22 is an image sensor composed of, for example, a charge-coupled device (CCD) sensor or a complementary metal-oxide semiconductor (CMOS) sensor, which converts an optical image into an electrical signal. An analog-digital (A/D) converter 23 converts an analog signal into a digital signal. The A/D converter 23 is used to convert an analog signal output from the imaging unit 22 into a digital signal.

An image processing unit 24 performs predetermined resizing processing, such as pixel interpolation or reduction, or color conversion processing on data output from the A/D converter 23 or data output from a memory control unit 15. The image processing unit 24 performs predetermined arithmetic processing using the captured image data, and the system control unit 50 performs exposure control and distance measuring (focusing) control based on a result of the arithmetic processing obtained by the image processing unit 24. This enables performing AF processing of the through-the-lens (TTL) type, automatic exposure (AE) processing, and electronic flash pre-emission (EF) processing. The image processing unit 24 also performs predetermined arithmetic processing using the captured image data and also performs automatic white balance (AWB) processing of the TTL type based on a result of the predetermined arithmetic processing.

The display unit 28, which is a back-side monitor (an extra-viewfinder display unit) used to display an image, is not limited to the liquid crystal type as long as it is a display capable of displaying an image. For example, an organic electroluminescence (EL) type display may be used.

Output data from the A/D converter 23 is written into a memory 32 via the image processing unit 24 and the memory control unit 15 or directly via the memory control unit 15. The memory 32 stores image data obtained by the imaging unit 22 and converted into digital data by the A/D converter 23 and image data to be displayed on the display unit 28. The memory 32 contains a sufficient storage capacity to store a predetermined number of still images or a moving image and sound of a predetermined duration. The memory 32 also serves as a memory for image display. A digital-analog (D/A) converter 19 converts data for image display stored in the memory 32 into an analog signal and supplies the analog signal to the display unit 28 or the intra-viewfinder display unit 76. In this way, the image data for display written in the memory 32 is displayed by the display unit 28 or the intra-viewfinder display unit 76 via the D/A converter 19.

The display unit 28 or the intra-viewfinder display unit 76 provides a display corresponding to the analog signal from the D/A converter 19 on a display device, such as a liquid crystal display (LCD). The digital signal, which is a signal subjected to A/D conversion by the A/D converter 23 and accumulated in the memory 32, is converted into an analog signal by the D/A converter 19. The analog signal is then sequentially transferred to the display unit 28, so that the display unit 28 functions as an electronic view finder and can perform through-image display, i.e., live view display.

A non-volatile memory 56 is an electrically erasable and recordable memory, and can be, for example, an electrically erasable programmable read-only memory (EEPROM). The non-volatile memory 56 stores, for example, constants and programs used for operation of the system control unit 50. The programs as used herein refer to programs for executing various flowcharts of the present exemplary embodiment as described below.

The system control unit 50 controls the digital camera 100. The system control unit 50 implements processing operations of the present exemplary embodiment as described below by executing the above-mentioned programs recorded in the non-volatile memory 56. A system memory 52 is a random access memory (RAM), which enables, for example, constants and variables used for operation of the system control unit 50 and programs read from the non-volatile memory 56 to be loaded thereon. The system control unit 50 also performs display control by controlling, for example, the memory 32, the D/A converter 19, the display unit 28, and the intra-viewfinder display unit 76.

A system timer 53 is a time measurement unit, which measures times used for various control operations and the time of a built-in clock. The mode changeover switch 60, the shutter button 61, and the operation unit 70 serve as an operation unit used to input various operation instructions to the system control unit 50.

The mode changeover switch 60 changes over the operation mode of the system control unit 50 to any one of, for example, a shooting mode or a playback mode. The operation mode further includes, for example, various scene modes for shooting settings for respective different shooting scenes, a program AE mode, and a custom mode. The mode changeover switch 60 is used to directly change over the operation mode to any one of these modes included in a menu screen. Alternatively, after a menu screen is selected and displayed, the operation mode can be changed over to any one of these modes included in the menu screen using another operation member.

A first shutter switch 62 is turned on by a halfway operation, i.e., half-press operation, of the shutter button 61 provided on the digital camera 100. This generates a first shutter switch signal SW1, which is an instruction for shooting preparation. The first shutter switch signal SW1 is used to start operations including, for example, AF processing, AE processing, AWB processing, and EF processing.

A second shutter switch 64 is turned on by a complete operation, i.e., full press operation, of the shutter button 61. This generates a second shutter switch signal SW2, which is a shooting instruction. In response to the second shutter switch signal SW2, the system control unit 50 starts a series of shooting processing operations performed from the time of signal readout from the imaging unit 22 to the time of writing of image data to the recording medium 200.

Operation members of the operation unit 70 are assigned their respective functions as appropriate according to various scenes by selection and operation of various function icons displayed on the display unit 28, thus functioning as various function buttons. The operation unit 70 includes at least the following operation members: the shutter button 61, the main electronic dial 71, the power switch 72, the sub-electronic dial 73, the arrow keys 74, the SET button 75, the LV button 78, and the playback button 79. The user can intuitively perform various setting operations using a menu screen displayed on the display unit 28, four-direction (up, down, right, and left) buttons, and a SET button.

A power source control unit 80 includes a battery detection circuit, a direct current (DC)-DC converter, and a switch circuit that changes over a block to be energized, and detects the presence or absence of loading of a battery, the type of a battery, and the remaining amount of a battery. The power source control unit 80 also controls the DC-DC converter based on results of such detection and an instruction from the system control unit 50, and supplies, to various units including the recording medium 200, required voltages for required periods. The power switch 72 receives a changeover operation between ON and OFF of the power source.

A power source unit 30 includes a primary battery, such as alkaline battery or lithium battery, a secondary battery, such as nickel-cadmium (NiCd) battery, nickel-metal hydride (NiMH) battery, or lithium (Li) battery, and an alternating-current (AC) adapter. A recording medium interface (I/F) 18 is an interface with the recording medium 200, such as a memory card or a hard disk. The recording medium 200 is a recording medium, used to record captured images, and is composed of, for example, a semiconductor memory or a magnetic disk.

A communication unit 54 performs wireless or wired connection to transmit and receive video signals and audio signals. The communication unit 54 can connect to a wireless local area network (LAN) or the Internet. The communication unit 54 can transmit an image captured by the imaging unit 22, including a through-image, or an image recorded on the recording medium 200. The communication unit 54 can receive image data or other various pieces of information from an external apparatus.

One operation member of the operation unit 70 includes the touch panel 70a, which can detect contact with the display unit 28. The touch panel 70a and the display unit 28 can be integrated together. For example, the touch panel 70a is configured in such a way that the transmittance for light thereof does not disturb displaying by the display unit 28, and is fixed onto the upper layer of the display surface of the display unit 28. The input coordinates on the touch panel 70a are then associated with the corresponding display coordinates on the display unit 28. This enables configuring a graphical user interface (GUI) in such a manner that a user can directly operate a screen displayed on the display unit 28.

In this way, setting for receiving an instruction while associating a position where a touch operation has been performed and a position on the display unit 28 with each other is referred to as "absolute coordinate setting". Setting for receiving an instruction on a position to which a touch operation has moved according to an amount of movement thereof and a direction of movement thereof from a predetermined position on the display unit 28, rather than the coordinates of a position where the touch operation has been performed, is referred to as "relative coordinate setting".

In the case of performing an operation while viewing the intra-viewfinder display unit 76, when performing a touch operation in the absolute coordinate setting, the user touches the touch panel 70*a* (the display unit 28) without viewing the touch panel 70*a*. This is likely to result in the user erroneously performing a touch operation on a position deviating from an intended position. When performing a touch operation in the relative coordinate setting, since a movement instruction is provided with an amount of movement instead of the position of the touch operation, the user can issue an instruction on an intended position by performing an operation to move to the intended position while viewing the position of an operation object displayed on the intra-viewfinder display unit 76.

The absolute coordinate setting and the relative coordinate setting are settable via a touchpad setting in the menu screen. The function of the touch panel 70*a* to receive a touch operation while no image is displayed on the display unit 28 is referred to as a "touchpad function".

The system control unit 50 is able to detect the following operations or states on the touch panel 70*a*:

the state in which a finger or stylus, which has not been touching the touch panel 70*a*, newly touches the touch panel 70*a*, i.e., starting of a touch (hereinafter referred to as "touch-down");

the state in which a finger or stylus is touching the touch panel 70*a* (hereinafter referred to as "touch-on");

the state in which a finger or stylus is moving while touching the touch panel 70*a* (hereinafter referred to as "touch-move");

the state in which a finger or stylus, which has been touching the touch panel 70*a*, has been removed from the touch panel 70*a*, i.e., ending of a touch (hereinafter referred to as "touch-up"); and the state in which no touching of the touch panel occurs 70*a* (hereinafter referred to as "touch-off").

When "touch-down" is detected, "touch-on" is detected at the same time. After "touch-down", unless "touch-up" is detected, "touch-on" normally continues being detected. "Touch-move" is also detected in the state in which "touch-on" is detected. Even if "touch-on" is detected, unless the touch position is not moving, "touch-move" is not detected. After "touch-up" of any fingers, stylus, etc., touching the touch panel 70*a* is detected, "touch-off" is detected.

Information on these operations or states and the coordinates of a position where a finger or stylus is touching the touch panel 70*a* is transmitted to the system control unit 50. The system control unit 50 then determines, based on the transmitted information, how an operation has been performed on the touch panel 70*a*. With regard to "touch-move", the system control unit 50 can also detect, based on a change of position coordinates, the direction of movement of a finger or stylus moving on the touch panel 70*a* for each of a vertical component and a horizontal component on the touch panel 70*a*. A series of operations performed from detection of "touch-on" to prompt "touch-up" without "touch-move" is referred to as a "tap". The operation performed from "touch-down" to "touch-up" via a predetermined "touch-move" on the touch panel 70*a* is referred to as "drawing a stroke".

The operation of quickly drawing a stroke is referred to as "flick". The flick is an operation of quickly moving a finger or stylus a certain degree of distance while keeping the finger or stylus touching the touch panel 70*a* and then directly removing the finger or stylus from the touch panel 70*a*. In other words, it is an operation of tracing the surface of the touch panel 70*a* as if flicking the touch panel 70*a* with a finger or stylus. When "touch-move" performed a predetermined distance or more at a predetermined speed or higher is detected and "touch-up" is then detected, it is determined that flick has been performed. When "touch-move" performed a predetermined distance or more at a predetermined speed or higher is detected, it is determined that drag has been performed.

The touch panel 70*a* can be any type of touch panel selected from among touch panels of various types including, resistance film type, capacitance type, surface acoustic wave type, infrared ray type, electromagnetic induction type, image recognition type, and optical sensor type. Among these types, there are a type that detect that a touch has been performed based on contact with the touch panel and a type that detect that touch has been performed based on access of a finger or stylus to the touch panel. Any one of the two types can be employed.

Figure 3A:
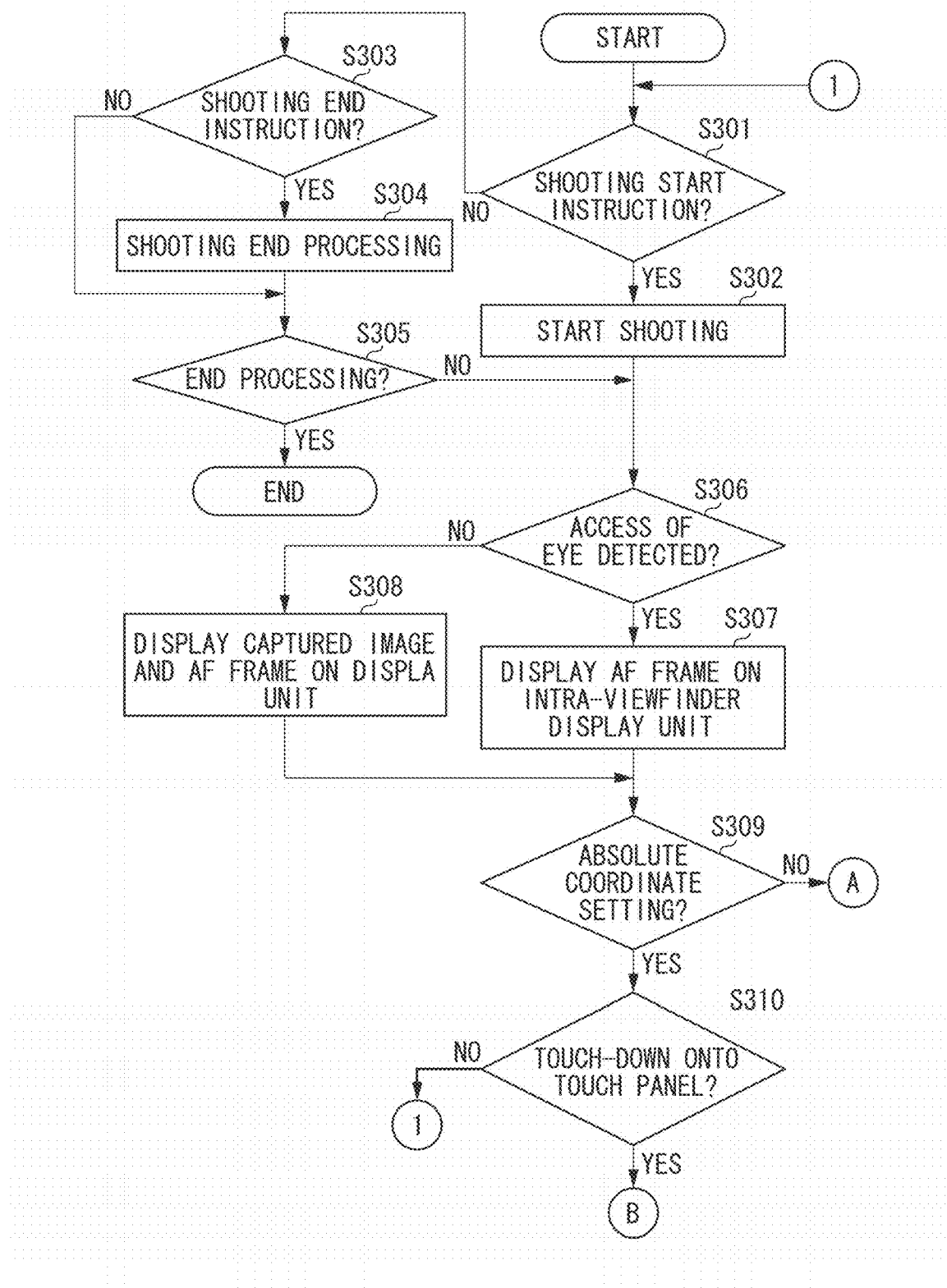

Setting processing of AF coordinates in the present exemplary embodiment is described with reference to FIGS. 3A, 3B, and 3C. This processing is implemented by the system control unit 50 loading a program recorded in the nonvolatile memory 56 into the system memory 52 and executing the program. This processing is started when the digital camera 100 is powered on and changed over to the shooting mode.

In the present exemplary embodiment, for example, when the user looks through, i.e., the user's eye gains access to, the intra-viewfinder display unit 76, information indications are displayed on the intra-viewfinder display unit 76. When the user's eye does not gain access to the intra-viewfinder display unit 76, a captured image and information indications are displayed on the display unit 28, which as previously described is located on the back surface of the digital camera 100.

Herein, the case where a captured image is displayed on the touch panel 70*a* (the display unit 28) is referred to as a state in which a display is made on the touch panel 70*a*. The case where no captured image is displayed on the touch panel 70*a* is referred to as a state in which no display is made on the touch panel 70*a*. However, ON or OFF of displaying of a captured image on the touch panel 70*a* does not necessarily depend on whether the user's eye gains access to the intra-viewfinder display unit 76. It can be independently switched via user setting. When a display is made on an external display panel, displaying on the touch panel 70*a* can be turned OFF. When no display is made on the external display panel, displaying on the touch panel 70*a* can be turned ON.

The AF coordinates or the position where an AF frame is displayed represents a position in which a subject targeted for AF processing is located within a captured image range. AF processing is performed in such a way as to focus on the subject located at the set position.

In step S301, the system control unit 50 determines whether a shooting start instruction has been issued by the press of the shutter button 61. If the system control unit 50 determines that the shooting start instruction has been issued (YES in step S301), the processing proceeds to step S302. If shooting start instruction has not been issued (NO in step S301), the processing proceeds to step S303. In a case where, while AF coordinates are set, AF processing is not yet performed on the set AF coordinates, AF processing can be performed in response to the issuance of a shooting preparation instruction, i.e., the first shutter switch signal SW1 by the press of the first shutter switch 62, or in response to the issuance of a shooting instruction.

In step S302, the system control unit 50 performs shooting processing. In the case of shooting of a still image, a captured image on which AF processing has been performed at a set position is recorded. In the case of shooting of a moving image, a position where to perform AF processing can be changed during recording. Each of the still image and the moving image is an image captured by the imaging unit 22. In a case where AF processing is performed at AF coordinates "B" in step S318, S321, or S332, which is described below, an image subjected to AF processing is recorded in the recording medium 200. Alternatively, the AF processing can be started in response to the first shutter switch signal SW1, i.e., the half press of the shutter button 61, without performing AF processing at the AF coordinates "B" in step S318, S321, or S332. In the case of performing AF processing in response to the first shutter switch signal SW1, without performing shooting in response to the second shutter switch signal SW2, a result of the AF processing performed in response to the first shutter switch signal SW1 can be confirmed in the intra-viewfinder display unit 76 together with the state of a captured image.

In step S303, the system control unit 50 determines whether an end instruction for moving image shooting has been issued by the press of the shutter button 61. The end instruction for moving image shooting can also be issued by the press of the LV button 78 during shooting of a moving image. However, when shooting of a moving image is not being performed, the determination in step S303 is not performed. If the system control unit 50 determines that an end instruction for moving image shooting has been issued (YES in step S303), the processing proceeds to step S304. If the end instruction for moving image shooting has not been issued (NO in step S303), the processing proceeds to step S305.

In step S304, the system control unit 50 performs end processing for a moving image. The end processing for a moving image includes performing processing for enabling playback of a generated moving image file obtained by, for example, generating attribute information, inter-frame information, and a thumbnail about the captured moving image file and performing compression processing. These pieces of information are stored in the recording medium 200 together with the moving image file.

In step S305, the system control unit 50 determines whether an operation to end setting processing of AF coordinates has been performed. If the system control unit 50 determines that an operation to end the setting processing has been performed (YES in step S305), the processing ends. If an operation to end the setting processing has not been performed (NO in step S305), the processing proceeds to step S306. The operation to end setting processing of AF coordinates includes, for example, an operation to turn off the power source and an operation to switch from the shooting mode to a playback mode or a menu screen mode.

In step S306, the system control unit 50 determines whether the eyepiece sensor 77 has detected access of the user's eye. If the system control unit 50 determines that the eyepiece sensor 77 has detected access of the user's eye (YES in step S306), the processing proceeds to step S307. If access of the user's eye has not been detected (NO in step S306), the processing proceeds to step S308.

In step S307, the system control unit 50 displays a frame 401 (mark or sign) indicating AF coordinates "B" on the intra-viewfinder display unit 76 as illustrated in the right-hand figure of FIG. 4A. In FIG. 4A, the finger Y is not touching the touch panel 70a. FIGS. 4A, 4B, 4C, and 4D illustrate the behaviors of operations on the touch panel 70a and the corresponding behaviors of the intra-viewfinder display unit 76 in a case where no display is made on the display unit 28 (the touch panel 70a), i.e., in a case where the touch panel 70a is used as a touchpad.

The background image illustrated as the behavior of the intra-viewfinder display unit 76 is an optical image that is viewable by the user, and is not an image displayed on the intra-viewfinder display unit 76. Although it is supposed that AF processing is being performed in the position where the frame 401 is displayed, in a case where, as the processing comes to step S307 without passing through step S318, S321, or S332 described below, the AF coordinates "B" are not previously determined, the frame 401 does not need to be displayed. Alternatively, before a setting operation is received from the user, any position on the detected face can be set as the AF coordinates "B", or the central position of an imaging region can be set as the AF coordinates "B". In the present exemplary embodiment, a guide, such as the frame 401, is displayed on the intra-viewfinder display unit 76 in an optical viewfinder (OVF). However, a guide, such as a frame, can be displayed together with a captured image in an EVF.

Figure 5A:
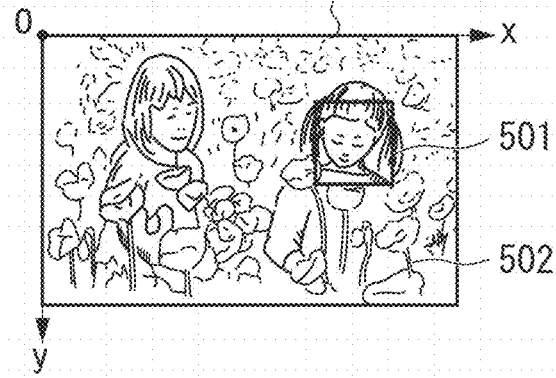
FIGS. 5A, 5B, and 5C illustrate behaviors performed when a display is made on a display unit with absolute coordinate setting in the exemplary embodiment.
Figure 5B:
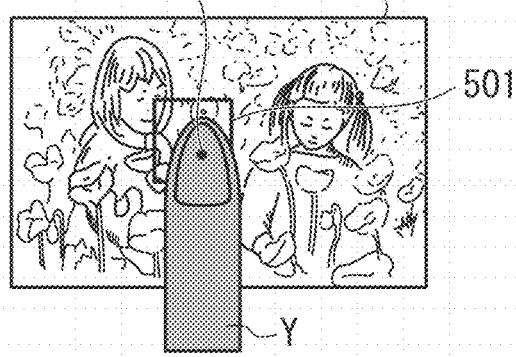
Figure 5C:
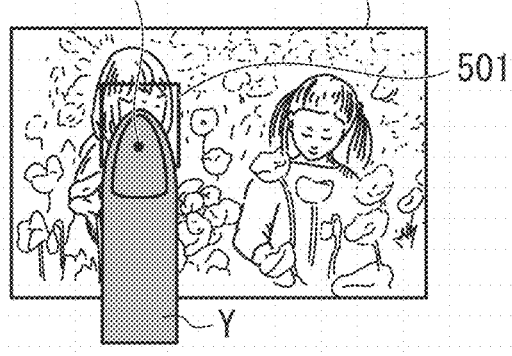

In step S308, as illustrated in FIG. 5A, the system control unit 50 displays an image captured by the imaging unit 22, i.e., a captured image 502 or a live view image, on the display unit 28 and displays a frame 501 at the AF coordinates "B". In FIG. 5A, the finger Y is not touching the touch panel 70a. FIGS. 5A, 5B, and 5C illustrate the behaviors of operations on the touch panel 70a and the corresponding behaviors of displaying on the display unit 28 in a case where a display is made on the touch panel 70a (the display unit 28).

In step S309, the system control unit 50 determines whether the absolute coordinate setting is set. If the system control unit 50 determines that the absolute coordinate setting is set (YES in step S309), the processing proceeds to step S310. If the absolute coordinate setting is not set (in the case of the relative coordinate setting) (NO in step S309), the processing proceeds to step S323. In another exemplary embodiment, the processing in steps S323 to S332 do not need to be performed. Moreover, if, in step S306, it is determined that access of the user's eye has been detected (YES in step S306), the system control unit 50 can perform processing in steps S310, S311, and S313 to S318 without performing processing in steps S309 and S312. Additionally, if, in step S306, it is determined that access of the user's eye has not been detected (NO in step S306), the processing can proceed to steps S310 to S312 and, the system control unit 50 can then perform processing in steps S319 to S322.

Alternatively, in the case where access of the user's eye is detected, relative coordinate inputting can be set and the system control unit 50 can perform processing in steps S323 to S332 and exclude steps S327 and S328. In the case where access of the user's eye is not detected, absolute coordinate inputting can be set and the system control unit 50 can perform processing in steps S319 to S322. In other words, in a case where the user is performing an operation while viewing the intra-viewfinder display unit 76 with access of the user's eye being detected, since the user is less likely to grasp an accurate touch position on the touch panel 70a, the user can set a position while moving the touch position with the relative coordinate inputting. In a case where the user is performing an operation while viewing the touch panel 70*a* with access of the user's eye not being detected, since the user is able to more accurately grasp which position is being touched on the touch panel 70*a*, the user can directly specify/set a position with the absolute coordinate inputting.

In step S310, the system control unit 50 determines whether "touch-down" onto the touch panel 70*a* has been performed. If the system control unit 50 determines that "touch-down" has been performed (YES in step S310), the processing proceeds to step S311. If "touch-down" has not been performed (NO in step S310), the processing returns to step S301.

In step S311, the system control unit 50 acquires touch coordinates "T(Xt, Yt)" of a touch point on the touch panel 70*a*, and records the acquired touch coordinates "T(Xt, Yt)" in the system memory 52. As displayed on the touch panel 70*a* illustrated in FIGS. 4B and 4C, the position which the finger Y is touching serves as the touch coordinates "T". Coordinates on the touch panel 70*a* have the x-axis in the horizontal direction, the y-axis in the vertical direction, and the origin at the upper left corner as in the touch panel 70*a* illustrated in FIG. 4A. In the example illustrated in FIG. 4B, the equation "touch coordinates T(Xt, Yt)=(X1, Y1)" holds and, in the example illustrated in FIG. 4C, the equation "touch coordinates T(Xt, Yt)=(X2, Y2)" holds.

In step S312, the system control unit 50 determines whether a captured image is being displayed on the touch panel 70*a*, i.e., whether switching to displaying on the display unit 28 has been performed. The system control unit 50 can perform this determination in conjunction with the determination whether access of the user's eye has been detected in step S306. More specifically, in a case where access of the user's eye has been detected, the processing proceeds to step S313 without performing AF processing associated with "touch-down". The system control unit 50 then changes AF coordinates "B" associated with "touch-move" and performs AF processing associated with "touch-up". In a case where access of the user's eye has not been detected, the processing proceeds to step S319, and the system control unit 50 sets a "touch-down" position as the AF coordinates "B" and performs AF processing associated with "touch-down".

Alternatively, in a case where access of the user's eye has been detected, it can be supposed that no captured image is being displayed on the touch panel 70*a*. In a case where access of the user's eye has not been detected, it can be supposed that a captured image is being displayed on the touch panel 70*a*. In other words, the system control unit 50 determines whether the user is performing an operation while viewing the touch panel 70*a* (the display unit 28) on which the user is performing a touch operation or the user is performing an operation while looking through the intra-viewfinder display unit 76. The system control unit 50 also determines whether the user is viewing both a finger with which a touch operation is being performed and a live view image (a subject) that serves as an operation object or the user is viewing a live view image that serves as an operation object without viewing a finger with which a touch operation is being performed.

In step S313, as illustrated in FIGS. 4B and 4C, the system control unit 50 displays a temporary frame 402 at the position of the touch coordinates "T" acquired in step S311 on the intra-viewfinder display unit 76. The temporary frame 402 differs from the frame 401 in display form. In a case where AF processing has already been performed on the AF coordinates "B" prior to step S310, even if the temporary frame 402 is displayed, AF processing is performed on the AF coordinates "B", i.e., the display position of the frame 401. The frame 401 can be hidden while the temporary frame 402 is displayed, or, instead of the temporary frame 402, the frame 401 can be displayed at the position of the touch coordinates "T". In step S314, the system control unit 50 sets temporary AF coordinates "A" to the touch coordinates "T" acquired in step S311, and records the temporary AF coordinates "A" in the system memory 52.

In step S315, the system control unit 50 determines whether "touch-up" from the touch panel 70*a* has been detected. In other words, the system control unit 50 determines whether the finger Y is not touching the touch panel 70*a* as indicated by the touch panel 70*a* illustrated in FIG. 4D. If the system control unit 50 determines that "touch-up" has been detected (YES in step S315), the processing proceeds to step S316. If "touch-up" has not been detected (NO in step S315), the processing returns to step S311, where the system control unit 50 acquires touch coordinates "T". In a case where "touch-move", which moves a touch position, has been performed without "touch-up" being performed, the touch position obtained after movement serves as the touch coordinates "T".

In a case where the user, who intends to touch the touch coordinates (X2, Y2) indicated on the touch panel 70*a* illustrated in FIG. 4C, has touched the touch coordinates (X1, Y1) indicated on the touch panel 70*a* illustrated in FIG. 4B, the position of the AF coordinates "B" is in no way determined unless touch-up is performed. In other words, after roughly touching a position to which the user intends to set AF coordinates, the user shifts the touch position little by little while viewing the intra-viewfinder display unit 76 so that the user can set the AF coordinates to an intended position by a small amount of movement of the touch position. Until "touch-up" is detected in step S315, AF processing on the AF coordinates "B" being currently set can be continued.

In step S316, the system control unit 50 sets (updates) the AF coordinates "B" to the temporary AF coordinates "A" set in step S314, and records the updated AF coordinates "B" in the system memory 52. Thus, in a case where the result of the determination in step S312 is NO, the AF coordinates "B" are updated in response to the occurrence of "touch-up" as well as updated by a touch operation. In other words, in a case where no display is made on the touch panel 70*a*, the touch coordinates acquired in step S311 are set as the AF coordinates "B" in response to the occurrence of "touch-up" in step S315.

In step S317, as indicated on the intra-viewfinder display unit 76 illustrated in FIG. 4D, the system control unit 50 displays the frame 401 at the coordinates (X2, Y2) where the temporary frame 402 has been displayed in FIG. 4C, i.e., switches from the temporary frame 402 to the frame 401). While the frame 401 is displayed at the coordinates (X2, Y2), the frame 401 that has been displayed at the AF coordinates "B" before updating in FIGS. 4A to 4C is hidden. In step S318, the system control unit 50 performs AF processing at the AF coordinates "B" set in step S316. Then, the processing returns to step S301.

In step S319, as indicated on the touch panel 70*a* illustrated in FIG. 5B, the system control unit 50 displays the frame 501 at the position of the touch coordinates "T" acquired in step S311 superimposed on the captured image 502 displayed in step S308. In step S320, the system control unit 50 sets (updates) the AF coordinates "B" to the touch coordinates "T" acquired in step S311, and records the updated AF coordinates "B" in the system memory 52. Thus, in a case where the result of the determination in step S312 is YES, the AF coordinates "B" are set to the touch coordinates. In other words, in a case where a display is made on the touch panel 70a, the user can immediately set the AF coordinates "B" to an intended position just by viewing and touching a position where the user intends to set the AF coordinates "B". Performing "touch-move" enables obtaining an image in which a focusing position is moved in such a way as to follow the trajectory of the touch position. In step S321, the system control unit 50 performs AF processing at the AF coordinates "B" set in step S320.

In step S322, the system control unit 50 determines whether "touch-up" from the touch panel 70a has been detected. If the system control unit 50 determines that "touch-up" has been detected (YES in step S322), the processing returns to step S301. If "touch-up" has not been detected (NO in step S322), the processing returns to step S311, where the system control unit 50 acquires the touch coordinates "T". In a case where the touch position has been moved, the touch position after movement serves as the touch coordinates "T". In a case where the result of the determination about "touch-up" is NO in step S322 and "touch-move" has been performed, the processing returns to step S311, where the system control unit 50 acquires the touch coordinates and then performs AF processing at the acquired touch coordinates, i.e., the position after movement by "touch-move".

If, in step S322, "touch-up" is not detected and "touch-move" is detected, the system control unit 50 can display the frame 401 at the position obtained after movement by "touch-move" while not changing the position of the lens from that obtained when AF processing has been performed in step S321 at the touch coordinates acquired in the preceding step S311, i.e., while performing focus lock. At this time, the system control unit 50 can perform AF processing at the position of the frame 401 after movement in response to a shooting instruction, i.e., the first shutter switch signal SW1.

Alternatively, if "touch-move" is detected, the system control unit 50 can perform focus lock, thus preventing the frame 401 from moving to the position after movement by "touch-move". More specifically, when "touch-down" is detected, the system control unit 50 performs AF processing at the "touch-down" position or sets the position serving as a criterion for AF processing. Even if "touch-move" is performed, the system control unit 50 does not perform AF processing at the position after movement or does not set the touch position after "touch-move" as the position serving as a criterion for AF processing.

Processing in steps S323 to S332 is performed in the case of relative coordinate setting. In step S323, as in step S310, the system control unit 50 determines whether "touch-down" onto the touch panel 70a has been performed. If the system control unit 50 determines that "touch-down" has been performed (YES in step S323), the processing proceeds to step S324. If "touch-down" has not been performed (NO in step S323), the processing returns to step S301.

Figure 6A:
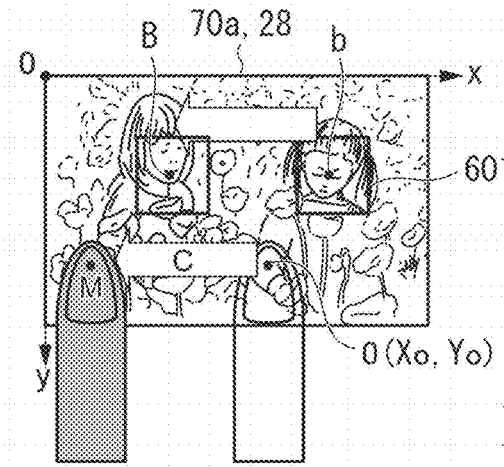
FIGS. 6A, 6B, 6C, and 6D illustrate behaviors performed when a display is made with relative coordinate setting in the exemplary embodiment.
Figure 6B:
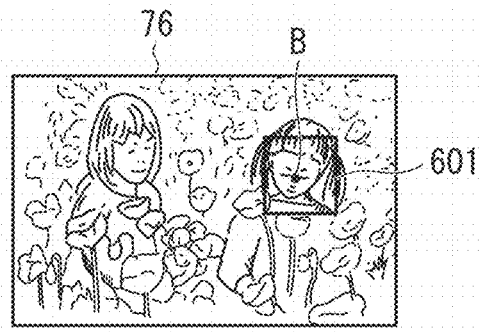
Figure 6C:
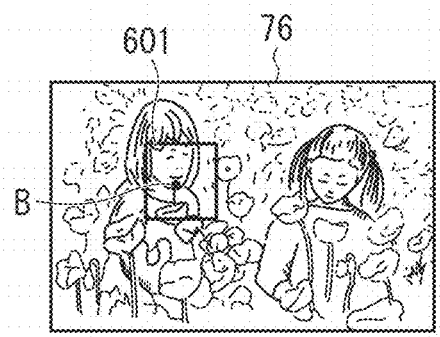
Figure 6D:
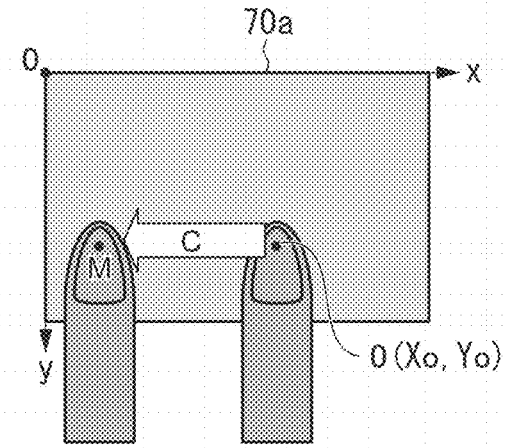

In step S324, the system control unit 50 acquires "touch-down" coordinates "O". The system control unit 50 acquires the touched position (Xo, Yo) indicated on the touch panel 70a illustrated in FIGS. 6A and 6D as the "touch-down" coordinates "O", and records the acquired touched position in the system memory 52. FIG. 6A illustrates the behavior of a touch operation and a display example in a case where a display is made on the touch panel 70a (the display unit 28). FIGS. 6B and 6C illustrate display examples on the intra-viewfinder display unit 76 in a case where no display is made on the touch panel 70a, and FIG. 6D illustrates the behavior of a touch operation on the touch panel 70a in the corresponding case.

In step S325, the system control unit 50 determines whether "touch-move", which moves the touch position, has been performed. If the system control unit 50 determines that "touch-move" has been performed (YES in step S325), the processing proceeds to step S326. If "touch-move" has not been performed (NO in step S325), the processing proceeds to step S331. For example, the system control unit 50 can detect "touch-move" in response to the touch position by the user being moved 5 mm or more or 1 cm or more. Thus, even if the finger of the user slightly moves, while the user does not move the touch position, the system control unit 50 can detect "touch-move".

In step S326, the system control unit 50 acquires relative coordinates "C". The relative coordinates "C" refer to a difference between the touch position moved by "touch-move" detected in step S325, e.g., touch coordinates "M(Xm, Ym)", and the "touch-down" coordinates O acquired in step S324. More specifically, as indicated on the touch panel 70a illustrated in FIGS. 6A and 6D, in a case where the finger Y has moved from the "touch-down" position, i.e., the touch-down coordinates "O", to the touch coordinates "M", the amount (distance and direction) by which the finger Y has moved serves as the relative coordinates "C". Thus, the relative coordinates "C" are expressed by the equation "C(Xc, Yc)=((Xm−Xo), (Ym−Yo))".

While, in step S330 described below, the system control unit 50 sets the AF coordinates "B", in a case where, after processing in step S330, the processing proceeds to step S331 and the result of the determination in step S325 is YES, in step S326, the system control unit 50 re-sets the AF coordinates "B" set in the preceding step S330 as the preceding AF coordinates "B(−1)". More specifically, since the movement of the touch position has been detected, the system control unit 50 re-sets the AF coordinates "B" obtained before the detection of movement of the touch position as the AF coordinates "B(−1)" and adds the relative coordinates "C" to the AF coordinates "B(−1)" as described below, thereby enabling moving the AF coordinates by the amount of movement of the touch position. In a case where the result in step S325 is determined as YES for the first time after the determination in step S323, the system control unit 50 re-sets the AF coordinates "B" set before the determination in step S323 as the AF coordinates "B(−1)".

In step S327, as in step S312, the system control unit 50 determines whether a captured image is being displayed on the touch panel 70a in step S308, i.e., whether switching to displaying on the display unit 28 has been performed. If the system control unit 50 determines that a captured image is being displayed on the touch panel 70a (YES in step S327), the processing proceeds to step S328. If the captured image is not being displayed (NO in step S327), the processing proceeds to step S329.

In step S328, as illustrated in FIG. 6A, the system control unit 50 displays a frame 601 at corresponding coordinates on the display unit 28 obtained by adding the relative coordinates "C" acquired in step S326 to the AF coordinates B obtained before "touch-down" is detected in step S323. The method of obtaining the corresponding coordinates is described below in step S330. While FIG. 6A illustrates the AF coordinates obtained before "touch-move" is performed (for illustrative purposes, referred to as "b") and the AF coordinates obtained after "touch-move" is performed (referred to as "B"), the frame 601 is actually displayed at the position of the coordinates "b" before "touch-move" and at the position of the coordinates "B" after "touch-move".

In step S329, as illustrated in FIG. 6C, the system control unit 50 displays a frame 601 at corresponding coordinates on the intra-viewfinder display unit 76 obtained by adding the relative coordinates "C" acquired in step S326 to the AF coordinates "B" illustrated in FIG. 6B and obtained before "touch-down" is detected in step S323. Thus, in the case of relative coordinate setting, the AF coordinates "B" are moved by the amount of movement of the touch position according to the movement of the touch position, and the frame 601 is also displayed at the position obtained after movement.

In step S330, the system control unit 50 sets the AF coordinates "B" at the position obtained after movement by the relative coordinates "C" acquired in step S326 from the AF coordinates "B(−1)", and records the set AF coordinates "B" in the system memory 52. As illustrated in FIGS. 6A to 6D, the AF coordinates "B" are moved to the position obtained after movement by the amount of movement "C" of the touch position illustrated in FIGS. 6A and 6D.

In step S331, the system control unit 50 determines whether "touch-up" from the touch panel 70a has been detected. If the system control unit 50 determines that "touch-up" has been detected (YES in step S331), the processing proceeds to step S332. If "touch-up" has not been detected (NO in step S331), the processing returns to step S325. Determinations in steps S325 and S331 are continued until "touch-move" is performed or "touch-up" is performed after "touch-down" is detected in step S323. In step S332, the system control unit 50 performs AF processing at the AF coordinates "B" set in step S330. Then, the processing returns to step S301.

According to the above-described exemplary embodiment, when setting a position where specific processing is to be performed on the touch panel 70a, the user can perform AF processing more promptly. Since, in a case where access of the user's eye is detected, the hand (finger) of the user performing an operation is not in sight, AF processing is not performed until "touch-up" is performed, the frame 401 is moved according to movement of the touch position, and AF processing is performed in response to "touch-up" being performed. In this way, since AF processing is not performed until "touch-up" is performed, even when the frame 401 is located at a position different from an intended position at the time of "touch-down", i.e., start of an operation, the touch position can be moved to move the frame 401 to the intended position.

When touch-up is performed after it is confirmed that the frame 401 has moved to the intended position, AF processing can be performed at a correct position. In other words, although, if AF processing is performed at the "touch-down" position, AF processing can be performed at a position that is not intended by the user, since AF processing is prevented from being performed until "touch-up" is performed, the possibility that AF processing is performed at the unintended position can be reduced.

Since at the time of access of the user's eye, even if a position where "touch-down" has been performed is different from an intended position, when "touch-up" is performed after the touch position is moved, AF processing can be performed at the intended position. In other words, in a case where the position where "touch-down" has been performed is not an intended position, since an operation for movement to the intended position and an operation for issuing an instruction to perform AF processing at the position obtained after movement do not need to be performed separately from each other, AF processing can be performed with a fewer number of operations and more promptly.

Since, in a case where access of the user's eye is not detected the user may be focused on performing a touch operation, touch is likely to be performed at a correct position. In particular, since, in a case where the user has performed "touch-down" while viewing a captured image, the user likely intends to set AF coordinates at a position where "touch-down" has been performed, setting the AF coordinates at the "touch-down" position and performing AF processing there enable prompt performing of AF processing.

If, after "touch-down" is performed, an instruction for performing AF processing at a position where "touch-down" has been performed is issued by an operation different from "touch-down", i.e., "touch-up" after "touch-down" or a tap operation, the number of operations required until AF processing is performed increases. In a case where the user is not looking through the intra-viewfinder display unit 76, but is viewing the touch panel 70a, if the position is specified by "touch-down", promptly performing AF processing according to an operation for specifying the position, i.e., "touch-down", is superior in operability.

In particular, in a case where a subject targeted for shooting is moving, as the timing from an AF instruction operation until AF processing is actually performed increases, the subject can move to a position farther away from the position where AF processing is performed. Therefore, the longer it takes until AF processing is started, the more difficult it becomes to correctly focus on the target subject. In a case where AF processing was not able to be performed as intended by the user, if an AF instruction has to be re-issued a number of times until AF processing can be performed on the intended subject, a shooting opportunity can be lost.

Even in a case where access of the user's eye is detected or in a case where it is not detected, setting of AF coordinates or AF processing can be performed in response to "touch-down" or a series of operations of "touch-up" after "touch-down". In a case where a moving image is being captured, when access of the user's eye is detected, AF coordinates can be set in response to "touch-up". In the case of waiting for shooting of a still image or waiting for shooting of a moving image, even when access of the user's eye is detected, AF coordinates can be set in response to "touch-down". In a case where AF coordinates are set in response to "touch-down", when the touch position is moved, the AF coordinates can be changed according to that movement and AF processing can be performed again in response to "touch-up".

During the process of capturing a moving image, since, in a case where the "touch-down" position has deviated from a position intended by the user even when access of the user's eye is not detected, an image in which AF processing has been performed at a position unintended by the user would be recorded, enabling AF processing to be performed at a more accurate position in response to touch-up is preferable. However, during shooting of a still image or during waiting for shooting, even if AF processing has been performed at an unintended position, since an image is not being recorded, an unintended image is not directly recorded.

In a case where the position where "touch-down" has been performed is a position intended by the user, setting AF coordinates immediately in response to "touch-down" enables promptly shifting to shooting. More specifically, when a moving image is being recorded, if access of the user's eye is detected, AF processing is performed in response to "touch-up", without AF processing being performed in response to touch-down. When no moving image is being recorded, even if access of the user's eye is detected, AF processing is performed in response to "touch-down". Alternatively, when no moving image is being recorded, even if access of the user's eye is not detected, AF processing is performed in response to "touch-down", and, when a moving image is being recorded, even if access of the user's eye is not detected, AF processing is performed in response to "touch-up", without AF processing being performed in response to "touch-down".

When a moving image is being captured, AF coordinates are not changed even if "touch-up" is performed. AF coordinates are then changed according to a determination operation, and, when a still image is being captured or during waiting for shooting, AF coordinates can be changed in response to "touch-up". The determination operation used when a moving image is being recorded is, for example, a tap operation or a double-tap operation.

While the present exemplary embodiment has described an operation for moving a position where to perform AF processing, the present exemplary embodiment is not limited to this operation and is applicable to, for example, setting/selecting positions/regions where to perform various processing operations. For example, the present exemplary embodiment is applicable to selecting a face AF frame used for focusing on a specific subject's face or selecting an enlargement or reduction position, i.e., zoom in or zoom out. The present exemplary embodiment is also applicable to a case where, when processing, such as AE or WB is performed, a subject, position, or region serving as a criterion for performing the processing is selected.

Control in the above-described processing was described as being performed by the system control unit 50. The control can also be performed by a single piece of hardware or by a plurality of pieces of hardware sharing processing operations to control an entire apparatus.

The above-described exemplary embodiment has been described with reference to a digital camera 100. However, any electronic apparatus that performs control to move a position where to perform processing based on a specified position, such as AF processing, AE processing, and AWB processing, is applicable. For example, a personal computer (PC), a portable image viewer, a digital photo frame, a music player, a gaming machine, an electronic book reader, a tablet PC, a smartphone, and a home electrical appliance. In addition, an apparatus, such as a smartphone, a tablet PC, or a desktop PC, which receives AF information about, for example, a digital camera via wired or wireless communication and displays the AF information to control, for example, a digital camera, is applicable.

Exemplary embodiments can also be implemented by performing the following processing. More specifically, the processing includes supplying software (a program) for implementing functions of the above-described exemplary embodiment to a system or apparatus via a network or any type of recording medium and causing a computer, or a central processing unit (CPU) or micro processing unit (MPU), of the system or apparatus to read and execute program code.

According to exemplary embodiments, specific processing can be promptly performed when a user performs a touch operation to determine a position where to perform the specific processing.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the exemplary embodiments have been described, it is to be understood that the disclosed exemplary embodiments are limiting. The scope of the following claims is to be accorded the broadest interpretation so as to encompass all such modifications and equivalent structures and functions.

This application claims the benefit of Japanese Patent Application No. 2016-000482 filed Jan. 5, 2016, which is hereby incorporated by reference herein in its entirety.

What is claimed is:

1. An electronic apparatus comprising:
a touch detector configured to detect a touch operation performed on an extra-viewfinder display;
an access detector configured to detect access to a viewfinder unit including an intra-viewfinder display; and
a memory and at least one processor and/or at least one circuit to perform operation of the following units:
a control unit configured to perform control to perform specific processing based on a position of the detected touch operation,
wherein, in a case where no access is detected, after a touch on the extra-viewfinder display is started, the control unit performs control to perform, during the touch, the specific processing based on a position where the touch is detected,
wherein, in a case access is detected, even if a touch on the extra-viewfinder display is started, the control unit performs control not to perform the specific processing on a position where the touch is detected, and when the touch is released from the extra-viewfinder display, the control unit performs control to perform the specific processing on a position where the touch is released,
wherein, in a case where access is detected, the control unit performs control to set, as a position serving as a criterion for the specific processing, a position not based on a position where start of a touch is detected and that has been moved according to an amount of movement of a touch position of the touch from a position serving as a criterion for the specific processing that is set before start of the touch is detected, and wherein, in a case where access is not detected, the control unit performs control to set, as a position serving as a criterion for the specific processing, a position based on a position where start of a touch is detected irrespective of a position serving as a criterion for the specific processing before start of the touch is detected.

2. The electronic apparatus according to claim 1, wherein the control unit performs control not to display an image on the extra-viewfinder display in a case where access is detected and performs control to display the image on the extra-viewfinder display in a case where access is not detected.

3. The electronic apparatus according to claim 2, wherein the control unit performs control not to display the image on the extra-viewfinder display but to display the image on the intra-viewfinder display in a case where access is detected.

4. The electronic apparatus according to claim 2, wherein the memory and at least one processor and/or at least one circuit further perform operation of:
an imaging unit, wherein the image is an image captured by the imaging unit.

5. The electronic apparatus according to claim 1, wherein, in a case where access is not detected, even if a touch is released after movement of a touch position is detected, the control unit performs control not to perform the specific processing based on a position where the touch has been released.

6. The electronic apparatus according to claim 5, wherein the memory and at least one processor and/or at least one circuit further perform operation of:
a reception unit configured to receive an instruction for image capturing preparation,
wherein, in response to receipt of the instruction for image capturing preparation and in a case where access is not detected, the control unit performs control to perform the specific processing based on a position where a touch is released after movement of the touch position is detected.

7. The electronic apparatus according to claim 1, wherein, during a process of recording a captured moving image, in a case where access is detected, even if a touch on the extra-viewfinder display is started, the control unit performs control not to perform the specific processing based on a position where start of the touch is detected, and when the touch is released from the extra-viewfinder display, the control unit performs control to perform the specific processing based on a position where the touch is released, and, during a predetermined state not in the process of recording a captured moving image, even in a case where access is detected, in response to detection of start of a touch on the extra-viewfinder display, the control unit performs control to perform the specific processing based on a position where the touch is detected.

8. The electronic apparatus according to claim 1, wherein, during a predetermined state that is not in a process of recording a captured moving image, in a case where access is not detected, in response to detection of start of a touch on the extra-viewfinder display, the control unit performs control to perform the specific processing based on a position where the touch is detected, and, during the process of recording a captured moving image, even in a case where no access is detected, even if a touch on the extra-viewfinder display is started, the control unit performs control not to perform the specific processing based on a position where start of the touch has been detected, and when the touch is released from the extra-viewfinder display, the control unit performs control to perform the specific processing based on a position where the touch is released.

9. The electronic apparatus according to claim 1, wherein, in a case where access is not detected, even if a touch position is moved after the specific processing performed in response to start of a touch, the control unit performs control not to perform the specific processing.

10. The electronic apparatus according to claim 9,
wherein the specific processing is autofocus, and
wherein, in a case where access is detected, after a touch on the extra-viewfinder display is started, the control unit performs control not to perform autofocus after performing autofocus before start of the touch until the touch is released.

11. The electronic apparatus according to claim 1, wherein the specific processing is processing including at least autofocus, automatic exposure setting, or automatic white balance.

12. An electronic apparatus comprising:
a touch detector configured to detect a touch operation performed on an extra-viewfinder display;
an access detector configured to detect access by an object to a viewfinder unit including an intra-viewfinder display;
a memory and at least one processor and/or at least one circuit to perform operation of the following units:
a display control unit configured to perform control to display a first mark at a position serving as a criterion for performing specific processing on the extra-viewfinder display; and
a control unit configured to:
in a case where the access is not detected, after a touch on the extra-viewfinder display is started, perform control to display, during the touch, the first mark at a position where the touch is detected,
in a case where access is detected, even if a touch on the extra-viewfinder display is started, perform control not to display, during the touch, the first mark at a position where the touch is detected, and when the touch is released from the extra-viewfinder display, perform control to display the first mark at a position based on a position where the touch is released, and
in a case where access is detected, even if a touch operation on the extra-viewfinder display unit is performed, the first mark remains displayed at a position where the first mark is displayed before the touch operation is detected.

13. The electronic apparatus according to claim 12, wherein, in a case access is detected, in response to detection of a touch operation on the extra-viewfinder display, the control unit performs control to display a second mark, which is different from the first mark, at a position where the touch operation is detected.

14. A control method for an electronic apparatus, the control method comprising:
detecting a touch operation performed on an extra-viewfinder display;
detecting access by an object to a viewfinder unit including an intra-viewfinder display; and
performing specific processing based on a position of the detected touch operation,
wherein, in a case where access is not detected, after a touch on the extra-viewfinder display is started, performing, during the touch, the specific processing based on a position where the touch is detected, wherein, in a case where access is detected, even if a touch on the extra-viewfinder display is started, the specific processing based on a position where the touch is detected is not performed, and when the touch is released from the extra-viewfinder display, performing the specific processing based on a position where the touch is released, wherein, in a case where access is detected, performing control to set, as a position serving as a criterion for the specific processing, a position not based on a position where start of a touch is detected and that has been moved according to an amount of movement of a touch position of the touch from a position serving as a criterion for the specific processing that is set before start of the touch is detected, and wherein, in a case where access is not detected, performing control to set, as a position serving as a criterion for the specific processing, a position based on a position where start of a touch is detected irrespective of a position serving as a criterion for the specific processing before start of the touch is detected.

15. A control method for an electronic apparatus, the control method comprising:

detecting a touch operation performed on an extra-viewfinder display;

detecting access by an object to a viewfinder unit including an intra-viewfinder display; and performing control to display a first mark at a position serving as a criterion for performing specific processing on the extra-viewfinder display, wherein, in a case access is not detected, after a touch on the extra-viewfinder display is started, displaying, during the touch, the first mark at a position where the touch is detected, wherein, in a case where access is detected, even if a touch on the extra-viewfinder display is started, not displaying, during the touch, the first mark at a position where the touch is detected, and when the touch is released from the extra-viewfinder display, displaying the first mark at a position based on a position where the touch is released, and wherein, in a case where access is detected, even if a touch operation on the extra-viewfinder display is performed, the first mark remains displayed at a position where the first mark is displayed before the touch operation is detected.

16. A non-transitory computer-readable storage medium storing computer-executable instructions that, when executed by a computer, cause a computer to execute a control method for an electronic apparatus, the control method comprising:

detecting a touch operation performed on an extra-viewfinder display;

detecting access by an object to a viewfinder unit including an intra-viewfinder display; and performing specific processing based on a position of the detected touch operation, wherein, in a case where access is not detected, after a touch on the extra-viewfinder display is started, performing, during the touch, the specific processing based on a position where the touch is detected, wherein, in a case where access is detected, even if a touch on the extra-viewfinder display is started, the specific processing based on a position where the touch is detected is not performed, and when the touch is released from the extra-viewfinder display, performing the specific processing based on a position where the touch is released, wherein, in a case where access is detected, performing control to set, as a position serving as a criterion for the specific processing, a position not based on a position where start of a touch is detected and that has been moved according to an amount of movement of a touch position of the touch from a position serving as a criterion for the specific processing that is set before start of the touch is detected, and wherein, in a case where access is not detected, performing control to set, as a position serving as a criterion for the specific processing, a position based on a position where start of a touch is detected irrespective of a position serving as a criterion for the specific processing before start of the touch is detected.

17. A non-transitory computer-readable storage medium storing computer-executable instructions that, when executed by a computer, cause a computer to execute a control method for an electronic apparatus, the control method comprising:

detecting a touch operation performed on an extra-viewfinder display;

detecting access by an object to a viewfinder unit including an intra-viewfinder display; and performing control to display a first mark at a position serving as a criterion for performing specific processing on the extra-viewfinder display, wherein, in a case access is not detected, after a touch on the extra-viewfinder display is started, displaying, during the touch, the first mark at a position where the touch is detected, wherein, in a case where access is detected, even if a touch on the extra-viewfinder display is started, not displaying, during the touch, the first mark at a position where the touch is detected, and when the touch is released from the extra-viewfinder display, displaying the first mark at a position based on a position where the touch is released, and in a case where access is detected, even if a touch operation on the extra-viewfinder display unit is performed, the first mark remains displayed at a position where the first mark is displayed before the touch operation is detected.

18. An electronic apparatus comprising:

a touch detector configured to detect a touch operation performed on an extra-viewfinder display;

an access detector configured to detect access to a viewfinder unit including an intra-viewfinder display; and a memory and at least one processor and/or at least one circuit to perform operation of:

a control unit configured to perform control to perform specific processing based on a position of the detected touch operation, wherein, in a case where no access is detected, after a touch on the extra-viewfinder display is started, the control unit performs control to perform, during the touch, the specific processing based on a position where the touch is detected, wherein, in a case access is detected, even if a touch on the extra-viewfinder display is started, the control unit performs control not to perform the specific processing on a position where the touch is detected, and when the touch is released from the extra-viewfinder display, the control unit performs control to perform the specific processing on a position where the touch is released, and wherein, in a case where access is not detected, even if a touch is released after movement of a touch position is detected, the control unit performs control not to perform the specific processing based on a position where the touch has been released.

19. The electronic apparatus according to claim 18, wherein the memory and at least one processor and/or at least one circuit further perform operation of:
   a reception unit configured to receive an instruction for image capturing preparation,
   wherein, in response to receipt of the instruction for image capturing preparation and in a case where access is not detected, the control unit performs control to perform the specific processing based on a position where a touch is released after movement of the touch position is detected.

20. An electronic apparatus comprising:
   a touch detector configured to detect a touch operation performed on an extra-viewfinder display;
   an access detector configured to detect access to a viewfinder unit including an intra-viewfinder display; and
   a memory and at least one processor and/or at least one circuit to perform operation of the following units:
   a control unit configured to perform control to perform specific processing based on a position of the detected touch operation,
   wherein, in a case where no access is detected, after a touch on the extra-viewfinder display is started, the control unit performs control to perform, during the touch, the specific processing based on a position where the touch is detected,
   wherein, in a case access is detected, even if a touch on the extra-viewfinder display is started, the control unit performs control not to perform the specific processing on a position where the touch is detected, and when the touch is released from the extra-viewfinder display, the control unit performs control to perform the specific processing on a position where the touch is released, and
   wherein, during a process of recording a captured moving image, in a case where access is detected, even if a touch on the extra-viewfinder display is started, the control unit performs control not to perform the specific processing based on a position where start of the touch is detected, and when the touch is released from the extra-viewfinder display, the control unit performs control to perform the specific processing based on a position where the touch is released, and, during a predetermined state not in the process of recording a captured moving image, even in a case where access is detected, in response to detection of start of a touch on the extra-viewfinder display, the control unit performs control to perform the specific processing based on a position where the touch is detected.

21. An electronic apparatus comprising:
   a touch detector configured to detect a touch operation performed on an extra-viewfinder display;
   an access detector configured to detect access to a viewfinder unit including an intra-viewfinder display; and
   a memory and at least one processor and/or at least one circuit to perform operation of the following units:
   a control unit configured to perform control to perform specific processing based on a position of the detected touch operation,
   wherein, in a case where no access is detected, after a touch on the extra-viewfinder display is started, the control unit performs control to perform, during the touch, the specific processing based on a position where the touch is detected,
   wherein, in a case access is detected, even if a touch on the extra-viewfinder display is started, the control unit performs control not to perform the specific processing on a position where the touch is detected, and when the touch is released from the extra-viewfinder display, the control unit performs control to perform the specific processing on a position where the touch is released, and
   wherein, during a predetermined state that is not in a process of recording a captured moving image, in a case where access is not detected, in response to detection of start of a touch on the extra-viewfinder display, the control unit performs control to perform the specific processing based on a position where the touch is detected, and, during the process of recording a captured moving image, even in a case where no access is detected, even if a touch on the extra-viewfinder display is started, the control unit performs control not to perform the specific processing based on a position where start of the touch has been detected, and when the touch is released from the extra-viewfinder display, the control unit performs control to perform the specific processing based on a position where the touch is released.

22. An electronic apparatus comprising:
   a touch detector configured to detect a touch operation performed on an extra-viewfinder display;
   an access detector configured to detect access to a viewfinder unit including an intra-viewfinder display; and
   a memory and at least one processor and/or at least one circuit to perform operation of the following units:
   a control unit configured to perform control to perform specific processing based on a position of the detected touch operation,
   wherein, in a case where no access is detected, after a touch on the extra-viewfinder display is started, the control unit performs control to perform, during the touch, the specific processing based on a position where the touch is detected,
   wherein, in a case access is detected, even if a touch on the extra-viewfinder display is started, the control unit performs control not to perform the specific processing on a position where the touch is detected, and when the touch is released from the extra-viewfinder display, the control unit performs control to perform the specific processing on a position where the touch is released, and
   wherein, in a case where access is not detected, even if a touch position is moved after the specific processing performed in response to start of a touch, the control unit performs control not to perform the specific processing.

23. An electronic apparatus comprising:
   a touch detector configured to detect a touch operation performed on an extra-viewfinder display;
   an access detector configured to detect access to a viewfinder unit including an intra-viewfinder display; and
   a memory and at least one processor and/or at least one circuit to perform operation of the following units:
   a control unit configured to perform control to perform specific processing based on a position of the detected touch operation, wherein, in a case where no access is detected, after a touch on the extra-viewfinder display is started, the control unit performs control to perform, during the touch, the specific processing based on a position where the touch is detected, wherein, in a case access is detected, even if a touch on the extra-viewfinder display is started, the control unit performs control not to perform the specific processing on a position where the touch is detected, and when the touch is released from the extra-viewfinder display, the control unit performs control to perform the specific processing on a position where the touch is released, wherein the specific processing is autofocus, and wherein, in a case where access is detected, after a touch on the extra-viewfinder display is started, the control unit performs control not to perform autofocus after performing autofocus before start of the touch until the touch is released.

24. A control method for an electronic apparatus, the control method comprising:

detecting a touch operation performed on an extra-viewfinder display;

detecting access to a viewfinder unit including an intra-viewfinder display; and performing specific processing based on a position of the detected touch operation, wherein, in a case where no access is detected, after a touch on the extra-viewfinder display is started, performing, during the touch, the specific processing based on a position where the touch is detected, wherein, in a case access is detected, even if a touch on the extra-viewfinder display is started, the specific processing on a position where the touch is detected is not performed, and when the touch is released from the extra-viewfinder display, performing the specific processing on a position where the touch is released, and wherein, in a case where access is not detected, even if a touch is released after movement of a touch position is detected, the specific processing based on a position where the touch has been released is not performed.

25. A control method for an electronic apparatus, the control method comprising:

detecting a touch operation performed on an extra-viewfinder display;

detecting access to a viewfinder unit including an intra-viewfinder display; and performing specific processing based on a position of the detected touch operation, wherein, in a case where no access is detected, after a touch on the extra-viewfinder display is started, performing, during the touch, the specific processing based on a position where the touch is detected, wherein, in a case access is detected, even if a touch on the extra-viewfinder display is started, the specific processing on a position where the touch is detected is not performed, and when the touch is released from the extra-viewfinder display, performing the specific processing on a position where the touch is released, and wherein, during a process of recording a captured moving image, in a case where access is detected, even if a touch on the extra-viewfinder display is started, the specific processing based on a position where start of the touch is detected is not performed, and when the touch is released from the extra-viewfinder display, performing the specific processing based on a position where the touch is released, and, during a predetermined state not in the process of recording a captured moving image, even in a case where access is detected, in response to detection of start of a touch on the extra-viewfinder display, performing the specific processing based on a position where the touch is detected.

26. A control method for an electronic apparatus, the control method comprising:

detecting a touch operation performed on an extra-viewfinder display;

detecting access to a viewfinder unit including an intra-viewfinder display; and performing specific processing based on a position of the detected touch operation, wherein, in a case where no access is detected, after a touch on the extra-viewfinder display is started, performing, during the touch, the specific processing based on a position where the touch is detected, wherein, in a case access is detected, even if a touch on the extra-viewfinder display is started, the specific processing on a position where the touch is detected is not performed, and when the touch is released from the extra-viewfinder display, performing the specific processing on a position where the touch is released, and wherein, during a predetermined state that is not in a process of recording a captured moving image, in a case where access is not detected, in response to detection of start of a touch on the extra-viewfinder display, performing the specific processing based on a position where the touch is detected, and, during the process of recording a captured moving image, even in a case where no access is detected, even if a touch on the extra-viewfinder display is started, the specific processing based on a position where start of the touch has been detected is not performed, and when the touch is released from the extra-viewfinder display, the performing the specific processing based on a position where the touch is released.

27. A control method for an electronic apparatus, the control method comprising:

detecting a touch operation performed on an extra-viewfinder display;

detecting access to a viewfinder unit including an intra-viewfinder display; and performing specific processing based on a position of the detected touch operation, wherein, in a case where no access is detected, after a touch on the extra-viewfinder display is started, performing, during the touch, the specific processing based on a position where the touch is detected, wherein, in a case access is detected, even if a touch on the extra-viewfinder display is started, the specific processing on a position where the touch is detected is not performed, and when the touch is released from the extra-viewfinder display, performing the specific processing on a position where the touch is released, and wherein, in a case where access is not detected, even if a touch position is moved after the specific processing performed in response to start of a touch, the specific processing is not performed.

28. A control method for an electronic apparatus, the control method comprising:

detecting a touch operation performed on an extra-viewfinder display;

detecting access to a viewfinder unit including an intra-viewfinder display; and performing specific processing based on a position of the detected touch operation, wherein, in a case where no access is detected, after a touch on the extra-viewfinder display is started, performing, during the touch, the specific processing based on a position where the touch is detected, wherein, in a case access is detected, even if a touch on the extra-viewfinder display is started, the specific processing on a position where the touch is detected is not performed, and when the touch is released from the extra-viewfinder display, performing the specific processing on a position where the touch is released, wherein the specific processing is autofocus, and wherein, in a case where access is detected, after a touch on the extra-viewfinder display is started, and after performing autofocus before start of the touch until the touch is released, autofocus is not performed.

29. A non-transitory computer-readable storage medium storing computer-executable instructions that, when executed by a computer, cause a computer to execute a control method for an electronic apparatus, the control method comprising:

detecting a touch operation performed on an extra-viewfinder display;

detecting access to a viewfinder unit including an intra-viewfinder display; and performing specific processing based on a position of the detected touch operation, wherein, in a case where no access is detected, after a touch on the extra-viewfinder display is started, performing, during the touch, the specific processing based on a position where the touch is detected, wherein, in a case access is detected, even if a touch on the extra-viewfinder display is started, the specific processing on a position where the touch is detected is not performed, and when the touch is released from the extra-viewfinder display, performing the specific processing on a position where the touch is released, and wherein, in a case where access is not detected, even if a touch is released after movement of a touch position is detected, the specific processing based on a position where the touch has been released is not performed.

30. A non-transitory computer-readable storage medium storing computer-executable instructions that, when executed by a computer, cause a computer to execute a control method for an electronic apparatus, the control method comprising:

detecting a touch operation performed on an extra-viewfinder display;

detecting access to a viewfinder unit including an intra-viewfinder display; and performing specific processing based on a position of the detected touch operation, wherein, in a case where no access is detected, after a touch on the extra-viewfinder display is started, performing, during the touch, the specific processing based on a position where the touch is detected, wherein, in a case access is detected, even if a touch on the extra-viewfinder display is started, the specific processing on a position where the touch is detected is not performed, and when the touch is released from the extra-viewfinder display, performing the specific processing on a position where the touch is released, and wherein, during a process of recording a captured moving image, in a case where access is detected, even if a touch on the extra-viewfinder display is started, the specific processing based on a position where start of the touch is detected is not performed, and when the touch is released from the extra-viewfinder display, performing the specific processing based on a position where the touch is released, and, during a predetermined state not in the process of recording a captured moving image, even in a case where access is detected, in response to detection of start of a touch on the extra-viewfinder display, performing the specific processing based on a position where the touch is detected.

31. A non-transitory computer-readable storage medium storing computer-executable instructions that, when executed by a computer, cause a computer to execute a control method for an electronic apparatus, the control method comprising:

detecting a touch operation performed on an extra-viewfinder display;

detecting access to a viewfinder unit including an intra-viewfinder display; and performing specific processing based on a position of the detected touch operation, wherein, in a case where no access is detected, after a touch on the extra-viewfinder display is started, performing, during the touch, the specific processing based on a position where the touch is detected, wherein, in a case access is detected, even if a touch on the extra-viewfinder display is started, the specific processing on a position where the touch is detected is not performed, and when the touch is released from the extra-viewfinder display, performing the specific processing on a position where the touch is released, and wherein, during a predetermined state that is not in a process of recording a captured moving image, in a case where access is not detected, in response to detection of start of a touch on the extra-viewfinder display, performing the specific processing based on a position where the touch is detected, and, during the process of recording a captured moving image, even in a case where no access is detected, even if a touch on the extra-viewfinder display is started, the specific processing based on a position where start of the touch has been detected is not performed, and when the touch is released from the extra-viewfinder display, performing the specific processing based on a position where the touch is released.

32. A non-transitory computer-readable storage medium storing computer-executable instructions that, when executed by a computer, cause a computer to execute a control method for an electronic apparatus, the control method comprising:

detecting a touch operation performed on an extra-viewfinder display;

detecting access to a viewfinder unit including an intra-viewfinder display; and performing specific processing based on a position of the detected touch operation, wherein, in a case where no access is detected, after a touch on the extra-viewfinder display is started, performing, during the touch, the specific processing based on a position where the touch is detected, wherein, in a case access is detected, even if a touch on the extra-viewfinder display is started, the specific processing on a position where the touch is detected is not performed, and when the touch is released from the extra-viewfinder display, performing the specific processing on a position where the touch is released, and wherein, in a case where access is not detected, even if a touch position is moved after the specific processing performed in response to start of a touch, the specific processing is not performed.

33. A non-transitory computer-readable storage medium storing computer-executable instructions that, when executed by a computer, cause a computer to execute a control method for an electronic apparatus, the control method comprising:
- detecting a touch operation performed on an extra-viewfinder display;
- detecting access to a viewfinder unit including an intra-viewfinder display; and
- performing specific processing based on a position of the detected touch operation,
- wherein, in a case where no access is detected, after a touch on the extra-viewfinder display is started, performing, during the touch, the specific processing based on a position where the touch is detected,
- wherein, in a case access is detected, even if a touch on the extra-viewfinder display is started, the specific processing on a position where the touch is detected is not performed, and when the touch is released from the extra-viewfinder display, performing the specific processing on a position where the touch is released,
- wherein the specific processing is autofocus, and
- wherein, in a case where access is detected, after a touch on the extra-viewfinder display is started, and after performing autofocus before start of the touch until the touch is released, autofocus is not performed.

* * * * *